June 2, 1925.
W. T. ASHTON
SHOCK ABSORBER
Filed May 16, 1924
1,540,674
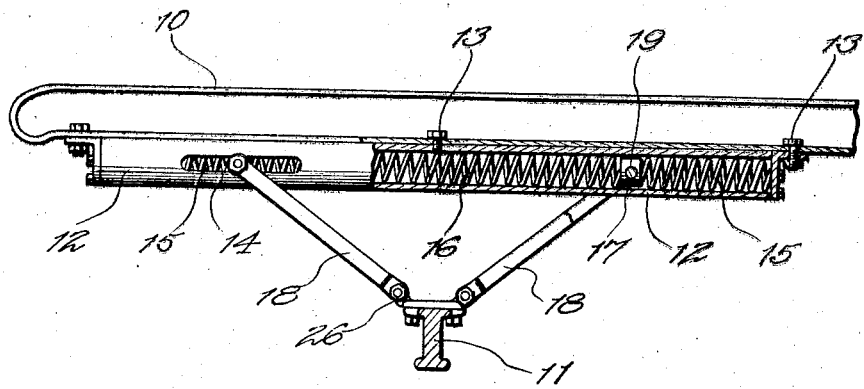
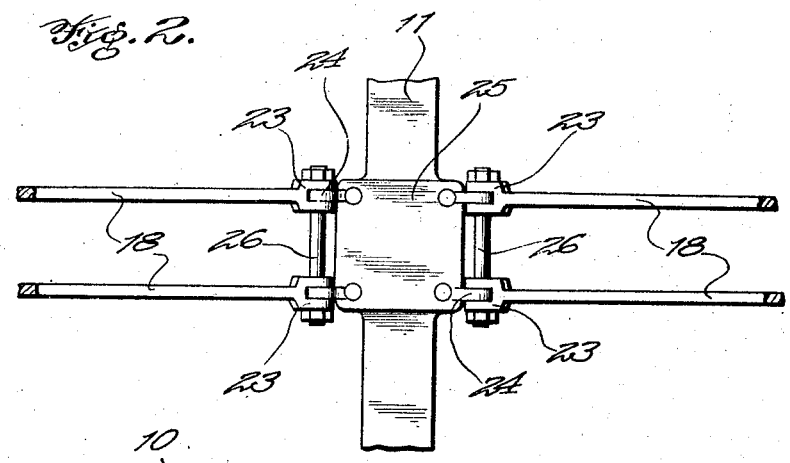
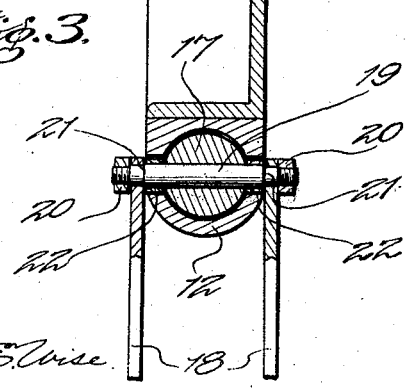
William T. Ashton
INVENTOR
BY Victor J. Evans
ATTORNEY
WITNESS:

Patented June 2, 1925.

1,540,674

UNITED STATES PATENT OFFICE.

WILLIAM T. ASHTON, OF NEW CASTLE, PENNSYLVANIA.

SHOCK ABSORBER.

Application filed May 16, 1924. Serial No. 713,824.

*To all whom it may concern:*

Be it known that I, WILLIAM T. ASHTON, a citizen of the United States, residing at New Castle, in the county of Lawrence and State of Pennsylvania, have invented new and useful Improvements in Shock Absorbers, of which the following is a specification.

This invention relates to shock absorbers for motor operated vehicles, and contemplates a novel construction and arrangement of parts, embodying amongst other features, a cylindrical casing including a plurality of coil springs arranged in end to end relation, together with plungers arranged to slide within the casing and positioned between the adjacent ends of said springs whereby certain springs absorb the shock to which the running gear is subjected to, while an intermediate spring is used to absorb the shock incident to the rebound, so that shocks and jars are prevented from being transmitted from the running gear to the body of the vehicle.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a side elevation of the invention showing the manner in which the shock absorber is associated with the frame of a vehicle and the adjacent axle.

Figure 2 is a top plan view of the axle showing how the oscillating arms are connected therewith.

Figure 3 is a transverse sectional view taken through the frame of the car and the shock absorber.

Referring to the drawing in detail, 10 represents the frame of a vehicle, while 11 indicates the adjacent axle.

The shock absorber forming the subject matter of the present invention is adapted to be interposed between the frame 10 and axle 11 as clearly shown in Figure 1. The shock absorber essentially embodies a cylindrical casing 12 which may vary in dimensions without departing from the spirit of the invention. This casing 12 is secured in any suitable manner as at 13 to the underside of the frame 10, and is formed at appropriate points in its length with spaced longitudinally disposed slots 14, although only one of such slots is shown in Figure 1. The purpose of these slots will be presently described. Arranged within the tubular casing are two end springs 15, and an intermediate spring 16, the end springs being used together to absorb the shocks transmitted to the running gear of the vehicle, while the intermediate spring 16 is employed to check the rebound as will be readily understood.

To accomplish this purpose I make use of a pair of sliding plungers 17, these plungers being arranged between the adjacent ends of the respective springs, and which plungers are connected to the oscillating arms above referred to. Upon inspection of Figure 3 it will be noted that there is a pair of these arms 18 for each plunger, the arms being arranged at the opposite sides of the casing 12, and apertured to receive the pivot pin 19 which passes transversely through the plunger 17, the pin being terminally threaded to accommodate nuts 20 which hold the parts operatively associated. It will be further noted upon inspection of Figure 3 that the pin 19 is provided with reduced end portions to define shoulders 21, and this prevents the arms 18 from exerting an inward pressure against the rollers 22, and thereby tend to bind these rollers against the plunger 17. The rollers 22 are loosely mounted upon each pin 19, and operate within the longitudinal slots 14 of the casing 12, riding against the upper and lower edges of these slots to both center the sliding plungers 17 and also to minimize friction. The corresponding lower extremities of each pair of oscillating arms 18 are bifurcated as at 23 to receive apertured lugs 24 which project from the corners of a plate 25 adapted to be secured upon the upper surface of the axle 11. Pivot bolts 26 connect the lower ends of the arms 18 with said plate 25, these bolts passing through the bifurcated extremities 23 of said arm and also through the apertured lugs 24.

In practice when the vehicle is travelling over rough or irregular surfaces, the shocks and jars ordinarily transmitted to the running gear is taken care of by the end springs 15. For instance when the axle 11 is pushed upwardly under such condition; the plungers 17 are moved toward the ends of the cylinder 12, thereby compressing the end springs 15 for the purpose just mentioned; and when the axle 11 is lowered to normal position, the plungers 17 are then moved toward each other, tending to compress the intermediate spring 16, which of course takes care of the rebound of the running gear, so that no shocks or jars can be transmitted therefrom to the body of the vehicle.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

A vehicle shock absorber comprising a casing arranged beneath the frame of the vehicle and having spaced longitudinally disposed slots, spaced end springs arranged in said casing, an intermediate spring arranged therein, sliding plungers positioned between the adjacent ends of the respective springs, a plate mounted upon the adjacent axle of the vehicle, a pair of oscillating arms pivoted on said plate for each of said plungers, a transverse pin passing through each plunger and the adjacent slots of said casing, and with which the adjacent ends of said arms are pivotally connected, whereby said plungers are simultaneously moved toward and away from each other for the purpose specified, and rollers loosely mounted on said pins and operating within said slots of the casing.

In testimony whereof I affix my signature.

WILLIAM T. ASHTON.